United States Patent

Hopfer

[15] 3,694,746

[45] Sept. 26, 1972

[54] THIN-FILM THERMOELECTRIC CALORIMETER FOR MEASURING LARGE VALUES OF MICROWAVE POWER

[72] Inventor: Samuel Hopfer, Brooklyn, N.Y.

[73] Assignee: General Microwave Corporation

[22] Filed: Feb. 9, 1970

[21] Appl. No.: 9,725

[52] U.S. Cl. ....................................324/95, 324/106

[51] Int. Cl. ............................G01r 21/04, G01r 5/26

[58] Field of Search ....324/95, 106; 73/355; 136/225

[56] References Cited

UNITED STATES PATENTS

| | | | |
|---|---|---|---|
| 3,405,271 | 10/1968 | Stevens et al. | 136/225 X |
| 3,384,819 | 5/1968 | Rinkel | 324/106 X |
| 3,237,101 | 2/1966 | Vaughan | 324/95 |
| 3,345,561 | 10/1967 | Martin | 324/95 |
| 3,487,305 | 12/1969 | Selby | 324/95 |
| 3,533,855 | 10/1970 | Lederman et al. | 324/106 X |
| 3,147,436 | 9/1964 | Hopfer | 324/95 |
| 3,098,984 | 7/1963 | Martin | 324/95 X |
| 3,447,082 | 5/1969 | Calderhead et al. | 324/95 X |
| 2,946,005 | 7/1960 | Waterfield et al. | 324/95 |

*Primary Examiner*—Rudolph V. Rolinec
*Assistant Examiner*—Ernest F. Karlsen
*Attorney*—Morton C. Jacobs

[57] ABSTRACT

A thermoelectric calorimeter for measuring microwave power in the watt range, and using a thin-film resistive load, maintains the temperature balance of the thermoelectric junctions by means of an aluminum oxide substrate on which the thermoelectric films are deposited. The substrate is effective for conducting the high level of heat energy produced with absorption of input power by the load to a heat sink (which is also used as the outer conductor of a waveguide that transmits the power to the load) and to a finned housing that receives the heat by conduction from the heat sink and is effective for transferring the heat energy to the ambient air by convection. The thin films of the load face frontwards in the unit and an electrical insulation having a low thermal resistance is provided.

21 Claims, 5 Drawing Figures

INVENTOR.
SAMUEL HOPFER

BY Morton C. Jacobs
ATTORNEY.

INVENTOR.
SAMUEL HOPFER

BY Morton C. Jacobs
ATTORNEY

INVENTOR.
SAMUEL HOPFER
BY Morton C. Jacobs
ATTORNEY

THIN-FILM THERMOELECTRIC CALORIMETER FOR MEASURING LARGE VALUES OF MICROWAVE POWER

BACKGROUND OF THE INVENTION

This invention relates to thin-film thermoelectric calorimeters for measuring microwave power, and particularly power in the watt range.

Prior to this invention, direct measurements of microwave power of the magnitude of watts and for the frequency range through X-band (up to about 10GHz) were primarily performed with forced cooling of the microwave power absorbing element (e.g., by immersion in a circulating stream of oil) in order to remove the large amount (watts) of power which is continuously supplied during the measuring process. In order for a microwave load to operate properly through X-band, it must be small relative to the wavelength at X-band (i.e., about an inch) for single-mode operation, which complicates the problem of carrying away heat produced by the absorbed power. For this reason, prior microwave instruments for measuring watts of power have used forced cooling and flow calorimetric techniques, and such flow calorimeters tend to be bulky, complex systems of medium accuracy and sluggish response (e.g. 3–5 seconds).

Thin-film thermoelectric calorimeters (such as those described in U.S. Patent No. 3,384,819, assigned to the same assignee, and in applicant's article, "Properties of Thermoelectric Elements as Microwave Power Detectors," 1962 IRE International Convention Record, Part 3, pp. 77–84) have been successfully used for wide band (e.g. through X-band) measurement of microwave power up to about 0.1 watt, and with a fraction-of-a-second response time (i.e., the time required for the instrument to respond to a power transient and attain a steady state condition).

Such thermoelectric calorimeters have not before this invention been used for watt-range measurement in the X-band region. The temperature difference between hot and cold junctions of the thermoelectric load must be restricted to about 20° C. for an approximately linear characteristic of the thermo-electric mechanism and of the energy dissipation mechanisms. Moreover, in order to achieve accurate measurements, the watt power to be measured has to be absorbed by and dissipated from the thermoelectric element directly. However, large resistive films suited for ready dissipation (e.g., by convection) of the heat due to the large amounts of absorbed microwave energy cannot be used because the cross-sectional dimensions for single-mode X-band operation cannot exceed about 0.5 inch. This invention is concerned with these problems in its general object of providing a suitable thermoelectric calorimeter for watt-range measurements at high frequency.

SUMMARY OF THE INVENTION

Accordingly, it is among the objects of this invention to provide a new and improved thin-film thermoelectric calorimeter suitable for microwave power measurement in the watt range and high frequency bands.

Another object is to provide a new and improved thin-film thermoelectric calorimeter constructed for effectively transferring to the ambient large amounts of power in the watt range absorbed by the load.

In accordance with one embodiment of the invention, a thermoelectric calorimeter for measuring microwave power in the watt range, and using a thin-film resistive load, employs an aluminum oxide substrate for the load upon which the thermoelectric films are deposited. Thereby, the temperature balance of the thermoelectric junctions is maintained and the substrate is effective for conducting (directly and via the center conductor) the high level of input energy absorbed by the films to the outer conductor of the waveguide terminated by the load and which functions as a heat sink. A finned housing receives energy by thermal conduction from the heat sink and is effective for transferring it to the ambient air by means of convection.

BRIEF DESCRIPTION OF THE DRAWING

The foregoing and other objects of this invention, the various features thereof, as well as the invention itself, may be more fully understood from the following description when read together with the accompanying drawing, in which.

In the drawing, corresponding parts are referenced by similar numerals throughout.

DESCRIPTION OF A PREFERRED EMBODIMENT

Figure 1:
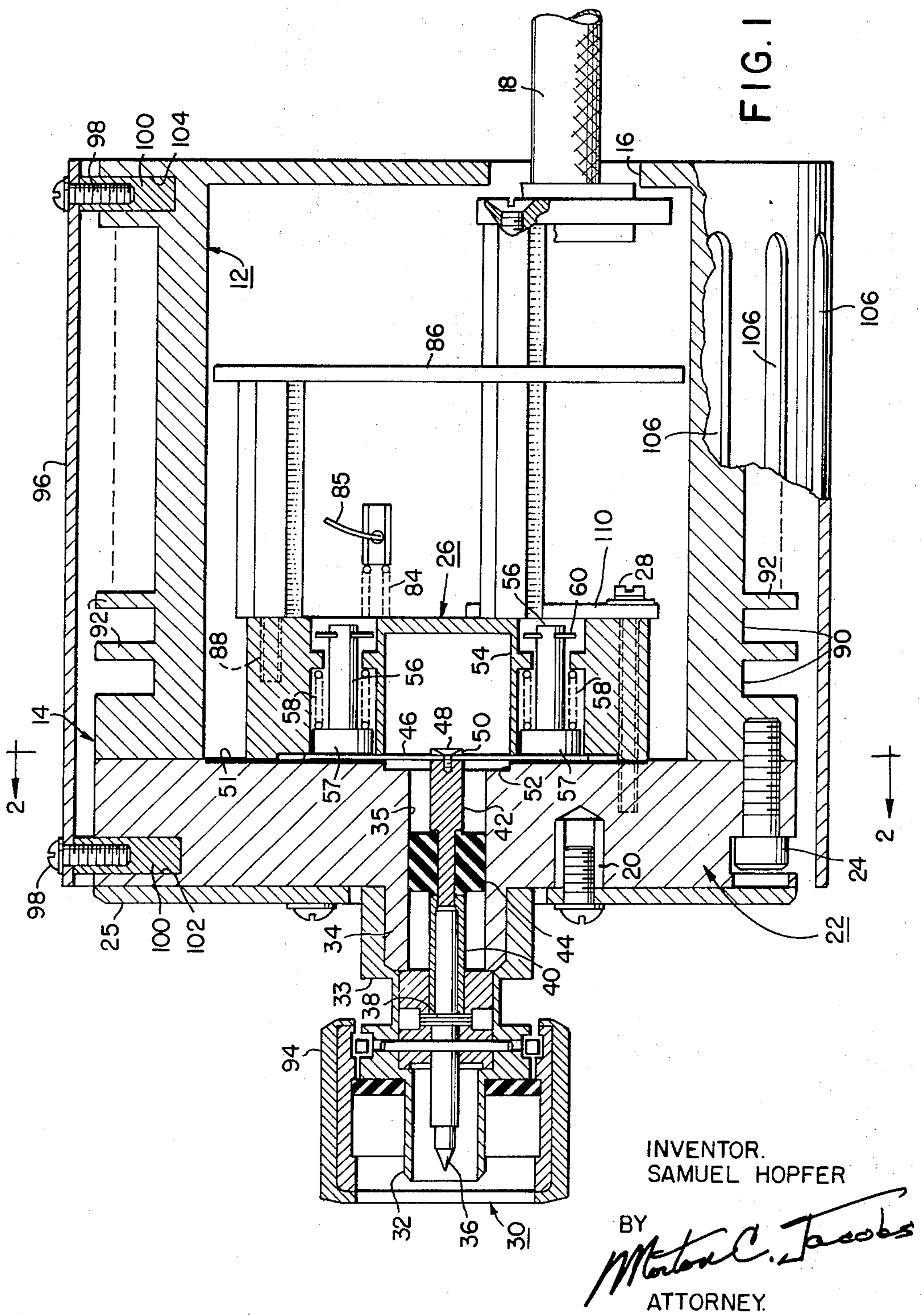
FIG. 1 is a longitudinal sectional view of a power measuring device having a coaxial transmission line in accordance with this invention.

The power measuring unit shown in the drawing includes a cylindrical metallic housing 12 which is open at the front end 14 and closed at the opposite, or rear, end except for an opening 16 that passes an output cable 18. A relatively thick cylindrical metallic plate 22 closes the front end of the cylindrical housing 12 and is bolted thereto by a plurality of screws 24. The plate 22 functions as a heat sink, and secured to its outer face by screws 20 is a sheet 25 of thermal insulation, such as a phenolic (or nylon) sheet, and black in color for good thermal radiation. A cylindrical metallic member 26 of substantial thickness which functions as a rear heat sink is bolted to the inner face of the front sink 22 by a plurality of screws 28. The rear heat sink 26 is of smaller diameter than the front sink 22 and is spaced from the inner wall of the cylindrical housing 12 which surrounds it. The housing 12 and heat sinks 22 and 26 are preferably constructed of a good thermal conductor such as aluminum.

Microwave power is supplied to the unit by means of a coaxial connector 30 of the male type and similar to that described in the aforementioned U.S. Patent, No. 3,384,819. The outer conductor 32 of the connector 30 is formed of stainless steel (having a low thermal conductivity) and has a rear portion 33 which surrounds and is in electrical contact with a central cylindrical throat 34 projecting from the outer face of the front sink 22. Thereby, a continuous outer conductor is provided from the connector members 32 and 33 of the connector 30 through the throat 34 to the remainder of the front heat sink 22; the wall 35 of the central opening of the sink is formed as a microwave cavity. The inner conductor of the coaxial connector includes a male contact 36 which is connected to one side of a fixed capacitor 38, the other side of which is connected by means of a hollow stainless steel rod section 40 to a solid stainless steel rod 42 which forms the rear section of the central conductor of the coaxial line. An annular bead 44 of dielectric material, but of good thermal conductivity of the order of aluminum (such as boron nitride), is connected between the central conductor 42 and the coaxial wall 35 of the heat sink 22 to transfer thermal energy from the center conductor to the coaxial wall so as to maintain those two metallic members at substantially the same temperature, as explained in the aforementioned U.S. Patent, No. 3,384,819.

Figure 2:
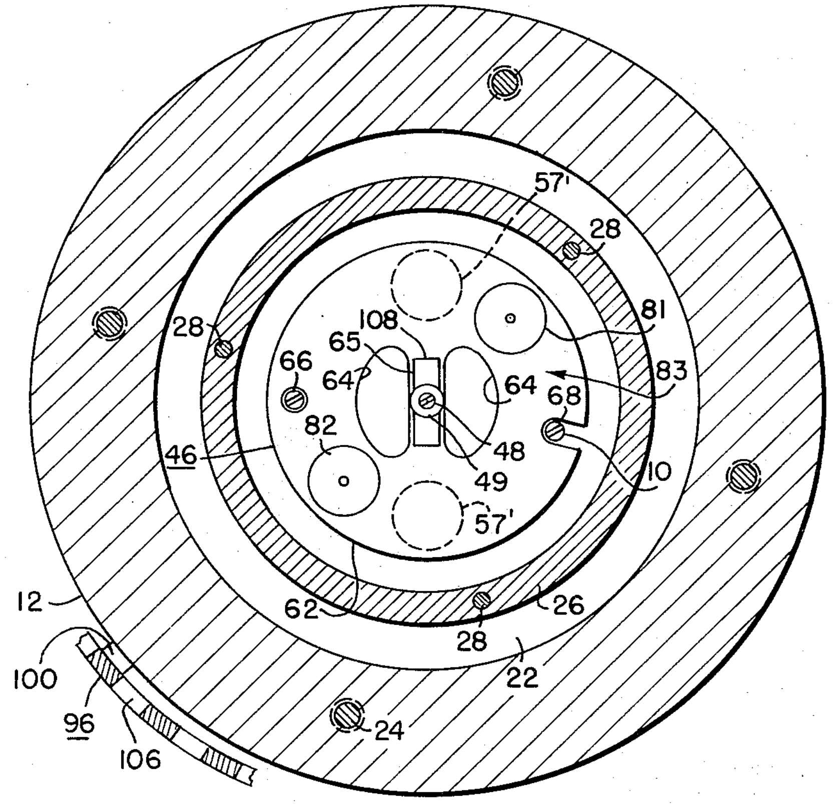
FIG. 2 is an enlarged sectional view taken along the line 2—2 of FIG. 1 and illustrating a plan view of the rear face of a thermopile element used in the device.

A microwave load in the form of a thermopile unit 46 is mounted between heat sinks 22 and 26 and is attached at its center by means of a metallic screw 48 and washer 50 to the rear face of the center conductor 42 (which lies in the same plane as the rear face 51 of heat sink 22). The diameters of the central opening 35 of heat sink 22 and of center rod 42 are appropriate for the desired coaxial line characteristics, and the opening 35 is generally uniform except for an enlarged portion 52 at the rear end thereof, adjacent to the load 46. The rear heat sink 26 has a central coaxial cavity 54 of a diameter similar to that of the surface 52 (preferably 0.5 inch for the former to 0.4 for the latter) and which is chosen to provide a waveguide beyond cutoff, and is of a depth suitable for a proper impedance match. The load 46 is held in position against the rear face 51 of the front sink 22 by means of pressure pins 56 having enlarged circular heads 57 that bear against the back surface 83 of the load 46 (at locations indicated by the broken-line circles 57′ in FIG. 2) under the pressure of biasing springs 58 that encircle the pins 56; retaining rings 60 limit the extent of movement of the pins 56 under the biasing springs 58.

Figure 3:
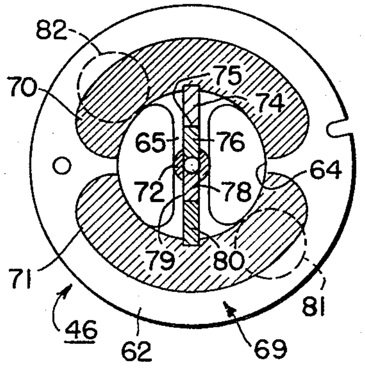
FIG. 3 is a plan view of the front face of the thermopile element of FIG. 2.

The thermopile load unit 46 includes a generally circular dielectric substrate 62 which has two large cutouts 64 (for purposes discussed hereinafter) with a web 65 therebetween. Smaller cutouts, appropriately located, uniquely position and index the load 46 onto two non-diametric dowel pins 66 and 68 (which project from the rear face of the front sink 22) and with the front face 69 of the load always located against the rear face 51 of the sink. The front face 69 (FIG. 3) of the substrate 62 bears the active electrical portion of the thermopile unit, which consists of two large kidney-shaped outer contact areas 70 and 71 and a small, central, circular contact area 72 formed by deposition of silver as thin films onto the substrate 62. Extending between the silver contact areas 70 and 72 and areas 72 and 71, and deposited on the substrate web 65 between cutouts 64, are a pair of thermopile units, each formed of two thin metallic film deposits 74, 76 and 78, 80 arranged as alternate depositions of different thermoelectric materials (preferably bismuth and nichrome). The contact areas 70 and 71 are overlapped by the outer nichrome and bismuth strips 74 and 80, respectively, and the central contact area 72 is overlapped by the inner corresponding bismuth and nichrome strips 76 and 78, respectively. The overlapping regions 75 and 79 of the bismuth and nichrome form two hot junctions which are effectively connected in series through the deposited resistive films 74, 76, 78, 80. The thickness of all the deposited films is made small relative to the skin depth at the highest operating radio frequency (preferably up to X-band), and the general construction of the films and the locations of overlapping portions (except as otherwise indicated) is the same as that described in the aforementioned U.S. Patent, No. 3,384,819.

Circular contact areas 81 and 82, which are silver plated, are formed on the rear face 83 of the load substrate, and are electrically connected by plating through holes in the substrate to the large contacts 70 on the front face of the load 46. A spring-biased electrical contact 84 extends through the rear sink 26 to engage the contact area 81 and thereby is electrically connected to the respective contact areas 70 on the front face thereof. An electrical output lead 85 is connected to contact 84. A similar contact (not shown) is diametrically opposite contact 84 for engaging contact area 82. These contacts 84 provide an output connection for the voltage generated by the thermopile unit in the manner described in the aforesaid U.S. Patent, No. 3,384,819. Thus, a series circuit for the generated voltage in the thermopile extends from the lead 85 through the contact 84 to the contact area 81 and to the corresponding kidney-shaped contact 71 on the front face 69 of load 46, to the overlapping nichrome resistive film strip 80 which also overlaps the bismuth strip 78 at hot junction 79; and strip 78 in turn overlaps another nichrome strip 76 (at the central contact 72), which in turn overlaps another bismuth film strip 74 (at hot junction 75), and strip 74 overlaps the other contact 70; and the circuit extends back through the plated contact area 82 to the other contact pin and lead (not shown). The two thermopile resistive sections on either side of the central contact 72 are effectively in parallel with regard to radio frequency signals which are supplied via the central coaxial connector 36, the capacitor 38 and central conductor sections 40 and 42 to the screw and washer 48 and 50 and (by way of the central contact area 72) in parallel through the respective resistive loads 74 and 76 and 78 and 80, and via the contact kidney areas 70, 71 to the front heat sink 22, which is part of the outer coaxial conductor. A dielectric is provided between the front face 69 of the load 46 and the rear face 51 of the front sink 22 so as to form a capacitive coupling between the rear face 51 and the contact areas 70 and 71 of the load. This dielectric is preferably formed by anodizing the rear face 51 of the heat sink; alternatively a silicon oxide coating may be applied to the front face 69 of the load.

A printed circuit board 86 is mounted within the housing 12 and secured by screws 88 to the rear sink 26. The leads 85 are connected via the components mounted on circuit board 86 to the output cable 18, which is connected to a power meter as described in the aforementioned U.S. Patent, No. 3,384,819.

The housing 12 is formed with a plurality of grooves 90 deeply cut into the periphery of the housing and extending all around. In one embodiment, 10 such grooves are cut in a cylindrical aluminum housing about 2.75 inches in diameter with the grooves being about 0.25 inch deep. The resulting fins 92 formed in the outer surface afford a thermal conduction and radiation area (provided with a black anodized finish) more than twice that of the corresponding ungrooved cylindrical surface. Thereby, a heat flow of 3 watts, absorbed by the load 46 and transferred directly by the load to the heat sinks and thence to the finned housing, is carried away due to convective action with a housing temperature raised 10°–15° C. above the ambient. Heat originating externally of the unit and tending to be supplied via the input connector 30 or through the touch of the hand is greatly reduced by insulation 94 covering the connector and the insulator 25 covering the front face of the front sink 22. The connector 30 itself can be designed, as explained in the aforementioned U.S. Patent, No. 3,384,819, to impede heat transfer into the unit. In addition, a cover 96 of thin (i.e., with low thermal conductance) aluminum tubing anodized black is mounted around the finned housing 12 and attached by a few spaced screws 98 threaded into insulating (e.g., nylon) spacers 100 which are forced into radial holes 102 spaced around the periphery of the front sink 22 and radial holes 104 around the rear periphery of the housing 12. Thus, the cover is spaced from the housing and tends not to transmit heat into the unit. The cover 96 has a series of elongated perforations 106 extending most of its length and spaced in parallel around its periphery, whereby convection currents can move effectively through the cover to remove heat from the finned housing, and at the same time the housing is largely isolated from external heat sources.

The operation of this calorimeter is generally similar to that described in the aforementioned U.S. Patent, No. 3,384,819. The microwave energy absorbed by the load thermocouples 74 to 80 raises the temperatures of their hot junctions 75 and 79 relative to outer and inner cold junctions which respectively correspond with the outer and inner contact areas 70, 71 and 72 associated with the outer and inner coaxial conductors 22 and 42. This temperature difference results in the generation of a direct voltage by the thermoelectric effect. The direct voltages of the two thermocouples are proportional to the absorbed power and are additive. With the hot junctions located substantially at the radial midpoints of the annular microwave cavity, the hot junctions 75 and 79 for zero input power are at substantially the same temperature which is the average of those at the inner and outer conductors. Thereby, any temperature difference between the inner and outer conductors results in the generation of d-c voltages in the thermocouples that are substantially equal and opposite in polarity, and therefore cancel, so that a reliable zero reference level is established for the measurements.

Thin films whose thicknesses are small relative to the skin effect at high frequencies provide a flat resistive characteristic from d-c up to microwave frequencies so that a wide-band terminating load of 50 ohms can be provided at least up through X-band. This X-band requirement, however, excludes the use of large cross-sectional dimensions above 0.5 inch for the load due to the higher modes of operation that exist; that is, frequency sensitivity due to these higher modes is effectively reduced by choosing these dimensions to be small enough so that the higher modes are far from their respective cutoff frequencies. With single-mode operation, the current distribution, and therefore the temperature distribution, tends to be invariant with frequency through the length of the load, and therefore the substitution principle may be validly applied to the instrument. Were the dimensions relatively large, a very important part of the heat at the hot junction could be dissipated by means of a convection mechanism; however, convection is not effective to get rid of the watt energy at the small dimensions required for X-band operation. The thermoelectric effect is not linearly proportional to temperature difference, but is actually non-linear, though for temperature differences of about 20° C. the non-linear response of the order of 2 percent for bismuth-antimony is tolerable; for bismuth-nichrome, the non-linearity is substantially reduced to less than 1 percent. Since there is no sufficiently accurate way of dividing the power to be measured over a large frequency range so that but a small proportional amount can be supplied to the load, the entire input power at the watt level must be supplied and dissipated. The calorimeter of the aforementioned U.S. Patent, No. 3,384,819, was intended for a power range of microwatts up to about 100 milliwatts; thus the power dissipation for the present invention is many times greater (e.g., 30 times for 3 watts).

Transient changes in the power input result, within a fraction of a second, in changes in the distribution of temperature in the load (the substrate of which has a suitable thermal capacity and conduction) to some equilibrium value which provides a temperature difference between the hot junction and the inner and outer waveguide surfaces of the coaxial conductor (which are representative of cold junctions). After about 15 minutes, for any energy input, the thermal distribution from the load to the ambient which is established (mainly by conduction within the housing and by convection from the fins 92 of the housing to the ambient) is approximately equal to the input energy and therefore no absolute changes take place in the hot junction temperature except as the ambient itself changes. Accordingly, a substantially steady temperature difference is established corresponding to the energy input. Thus there is no forced cooling of the instrument, nor is the heat generated by the input power transferred by a fluid medium for measurement externally of the load. With materials having a thermal conductivity independent of temperature (e.g., due to the ambient), the output would remain constant for constant input and over the 15-minute transition period; however, as noted below, the thermal conductivity of the substrate varies substantially with temperature.

Due to the small dimensions required for the X-band operation, conduction is the heat-transfer mechanism used for transferring the large amount of heat developed over the load to the surrounding heat sinks and thence to the finned housing from which it may be dissipated by way of convection. The substrate 62 is used for conducting heat away from the hot junction (the films are extremely thin and have a relatively high thermal resistance). The choice of materials for the substrate is based on having a material which is an electrical insulator in order not to interfere with the electromagnetic fields within the waveguide, but it must have a relatively small thermal resistance (namely, about 2.5° C. per watt) so that the temperature at the hot junction does not become excessive at the power levels for which the unit is intended. In addition, it is important that the temperature at the inner and outer coaxial waveguide surfaces be substantially the same, so that there is no thermal gradient at the hot junction and all of the variations of input are balanced out. However, since the thermal resistance of the front heat sink 22 (which is relatively thick) is very much less than the combined thermal resistance of the small center line section 42 and the thermally conductive electrical insulator 44, it can be seen that the temperature of the outer cold junctions adjacent to the front sink 22 would tend to be less than that at the center conductor 42, which would tend to produce a voltage for the zero input-power reference level and thereby introduce errors in the measurements. Accordingly, in order to achieve a condition in which the inner and outer cold junction temperatures are approximately equal, the thermal resistance of the substrate should be much greater than the combined thermal resistances of the central conductor and thermal-shunt bead 44. Since the latter two thermal resistances are relatively small, the temperature difference from the hot junction to the inner and outer conductors would be substantially due to the substrate thermal resistance and the other thermal resistances would have minor effect.

Aluminum oxide, it has been found, is practical for use as a dielectric substrate for the thin-film microwave load since aluminum oxide has very low loss tangents in the microwave region. With thicknesses of the order of 0.01 – 0.02 inch, the aluminum oxide has the desired thermal resistance of about 2.5° C. per watt, and it is suitable for deposition of the thin metallic films and for handling generally. Boron nitride, it has been found, is relatively difficult to deposit thin films on; beryllium oxide has a very much lower thermal resistance and unless impractically thin elements of the order of 0.003 inch are used, the thermal resistance would be so low that an effective temperature difference from the hot junction to the relative cold junctions would not be achieved and the sensitivity of the instrument would be seriously impaired if not destroyed. Though the substrate 62 is relatively thick, the response time for watt power measurements is at least as fast as the microwatt or milliwatt power measurements of the calorimeter described in the aforesaid U.S. Patent, No. 3,384,819.

Due to the substrate thickness of 0.02 inch (which, as explained below, may be augmented to about 0.03 inch), considerable difficulty in achieving a broadband match through X-band results except as the front face 69 of the load is mounted to face the front sink 22. Since the mount sensitivity to a first order is made to be dependent on the thermal resistance of the substrate by choosing it to be a value substantially greater than those of the other conductive elements of the unit, the thermal resistance between the contact areas 70 and 71 of the load and the rear face 51 of the outer conductor, it has been found, must be small relative to the thermal resistance of the substrate and, unless negligible, it must be stable and constant. Insulating cover sheets of mica which have been previously used are unsuitable, unless a sheet of about 0.001 inch or less is used. Alternatively, as noted above, by anodizing the rear face 51 of the sink 22, the required dielectric spacing with small thermal resistance can be achieved.

The thermal conductivity of the aluminum oxide substrate has a large temperature dependence, and in the vicinity of room temperature (e.g., 25° C.) the slope of the graph of thermal conductivity vs. temperature is approximately −0.5 percent change per degree Centigrade. With substantial heating due to the absorption of power of the order of 3 watts, the temperature of the entire housing (and therefore of the load) may rise by as much as 10 to 15° C. and the thermal conductivity would thereby decrease by about 7 percent. With a temperature increase due to power absorption, and during time dissipation, of 3 watts of absorbed microwave energy, the overall non-linearity of substrate conductivity may be as much as 10 – 15 percent. The sensitivity of the instrument (i.e., the d-c voltage generated per unit of power input) is directly dependent on the temperature difference between the hot and cold junctions, which in turn is dependent on the thermal conductivity of the substrate. Accordingly, the sensitivity changes by approximately the same amount as the thermal conductivity. The Seebeck coefficient, which is dependent upon the particular thermoelectric materials that are used, tends to produce an increase in sensitivity with an increase in temperature for the antimony-bismuth combination used in prior instruments of this type; this sensitivity non-linearity is in the same direction as that due to the thermal conductivity of the substrate and therefore they tend to be cumulative. It has been found, however, that a bismuth-nichrome combination for the thermocouples has practically zero non-linearity in the 7° to 10° temperature rise between the hot and cold junctions, corresponding to a 3-watt absorption. Accordingly, those thermocouple materials are used as described above.

With changes in ambient temperature and other external heating, as indicated above, the substrate temperature rises and therefore presents different thermal conductivities at different ambient temperatures. This effect of the ambient changes may be compensated for by means of a thermistor 110 which may be mounted on the back face of the rear sink, adjacent to the housing. This thermistor is connected in the metering circuit (in accordance with known techniques) and introduces a compensating resistance to effectively decrease the measured amount of generated voltage with increase in ambient temperature, thereby compensating for the increase in generated voltage due to increase in hot junction temperature (and consequent temperature difference in the load in the thermocouple) with decrease in thermal conductivity as the substrate temperature is elevated.

The non-linear thermal conductivity of the substrate due to temperature variations in the absorbed input power may be compensated by a boron nitride strip 108 about 0.01 inch thick which is placed over the central web 65 of the substrate 62 at the rear face 83 thereof. This boron nitride strip has substantially constant thermal conductivity (of the order of that of alumina) in the operating temperature range, and adds to the thermal conductivity of the substrate itself. Accordingly, the overall non-linearity is reduced somewhat (e.g., 1–2 percent). The dielectric strip 108 also helps to match the load and to reduce the VSWR at high frequencies.

The two cutouts 64 in the substrate 62 are located on either side of the web 65 on which the resistive load films 74–80 are deposited, and which web 65 is the medium for conducting the large amount of power absorbed by those films away to the heat sink 22. These cutouts reduce the high dielectric constant of the substrate material alumina (i.e., shorten its effective electrical cross-sectional diameter) for broadband performance to X-band. Thereby, phase changes that occur along the cross-sectional diameter tend to be smaller and higher modes are further removed from the cutoff frequencies so that the load can be effectively matched within 1.5 VSWR over the entire band through X-band. For this purpose, the cutouts 64 are located between the contact areas 70 and 71, which location requires that the dimensions of those contacts (the areas determine the capacitive coupling to the sink face 51) as well as of the cutouts be accommodated to each other and to the width of the web 65 (which must be sufficiently wide to conduct the large quantity of power absorbed by the load), all within the overall limitation of about 0.4 inch for the load length for X-band performance.

As noted above, to compensate for a variation in the substrate temperature due to variations in the ambient, a thermistor 110 (FIG. 1) may be located at the rear face of the rear sink 26 so that its resistance varies approximately with that temperature; and the thermistor 110 operates to vary the gain of the metering circuit to achieve approximately the desired compensation. The variation in conductivity of the substrate 62 is also due to temperature changes produced by variations in the power that is supplied and therefore absorbed by the load elements 74, 76, 78, 80, and such variations in substrate conductivity result in variations in the sensitivity of the measurements. Accordingly, it was found to be desirable to determine the changes that were actually produced in the substrate temperature, whatever the various causes, in order to provide accurate compensation. However, the thermistor 110 at the rear face of the rear sink 26 is too remote to be affected by absorbed power, and such a thermistor could not be located directly at the load without so absorbing r-f energy as to destroy any accuracy of compensation.

Figure 4:
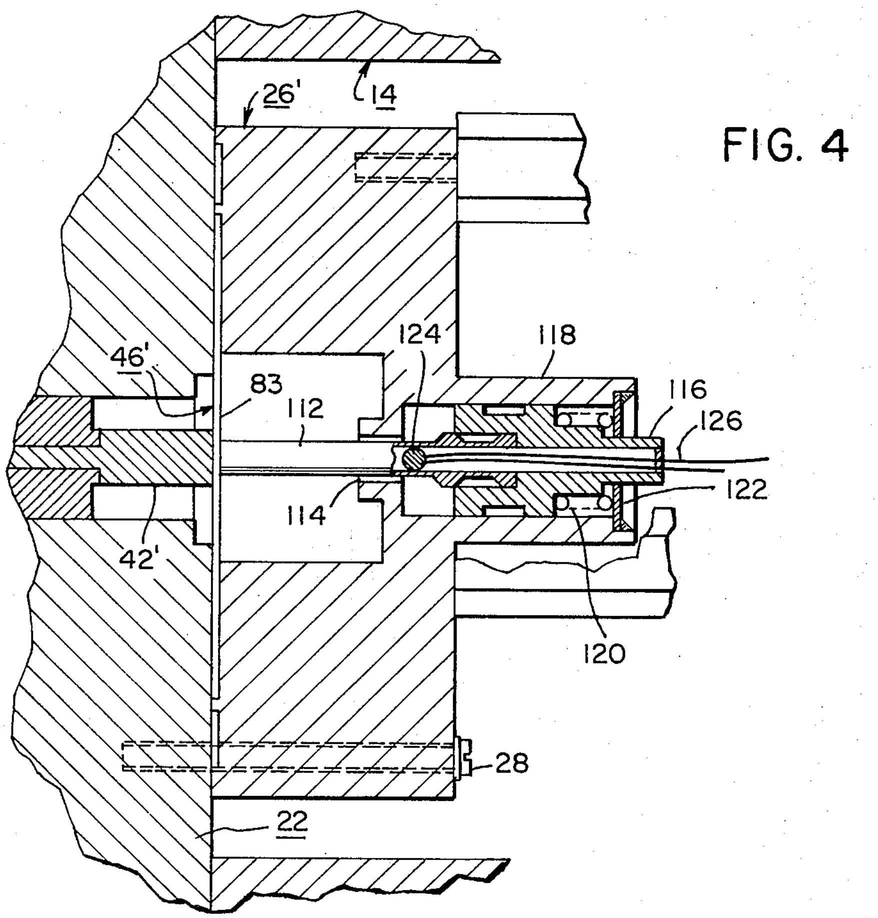
FIG. 4 is a fragmentary sectional view similar to FIG. 1 embodying a modification of the invention.

As shown in the modified construction of FIG. 4, a probe element 112 is provided which contacts the substrate 62 at its central location immediately opposite the central conductor 42'; in FIG. 4 parts similar to those shown in FIG. 1 but with modifications are referenced by the same numerals with the addition of a prime('). The thermal probe 112 is made of a boron nitride rod, which is a good thermal conductor. Due to the dielectric material of probe 112, it does not seriously affect the microwave characteristics of the termination, especially since its cross-sectional diameter is sufficiently small; i.e., this diameter is actually less than the cross-sectional diameter of the center conductor 42' itself. The rod 112 extends through an opening 114 in a boss at the center of the rear cavity wall of the sink 26' and rests in a hollow center portion of a cylindrical insulator rod 116 (e.g., of nylon) which in turn is slidably mounted in a hollow rearward extension 118 of the rear sink. The rod 112 is spaced from the metallic sink 26' to be thermally isolated from it. A spring 120 surrounds the insulator 116, and bearing between a shoulder thereon and a retainer ring 122, biases the insulator 116 and thereby the rod 112 against the rear face 83' of the load 46' to press the front face of the latter into firm contact with the face of the center conductor 42'. Preferably, the rod 42' is so dimensioned that its rear face extends to the rear about 0.002 inch beyond the plane of the rear face of the front sink 22. Thereby, the load is retained in position and makes good thermal and electrical contact with the rear face of conductor 42 as a result of being sandwiched between the two sinks; the spring biasing of probe 112 assists in this effect. This arrangement eliminates the screw 48 and washer 49 and the undesirable reactance effect that they tend to create, as well as the central hole in the load. The spring pressure (e.g., between 1 and 2 pounds) is sufficient to ensure that the load is held in good electrical and thermal contact with the center conductor 42'.

Figure 5:
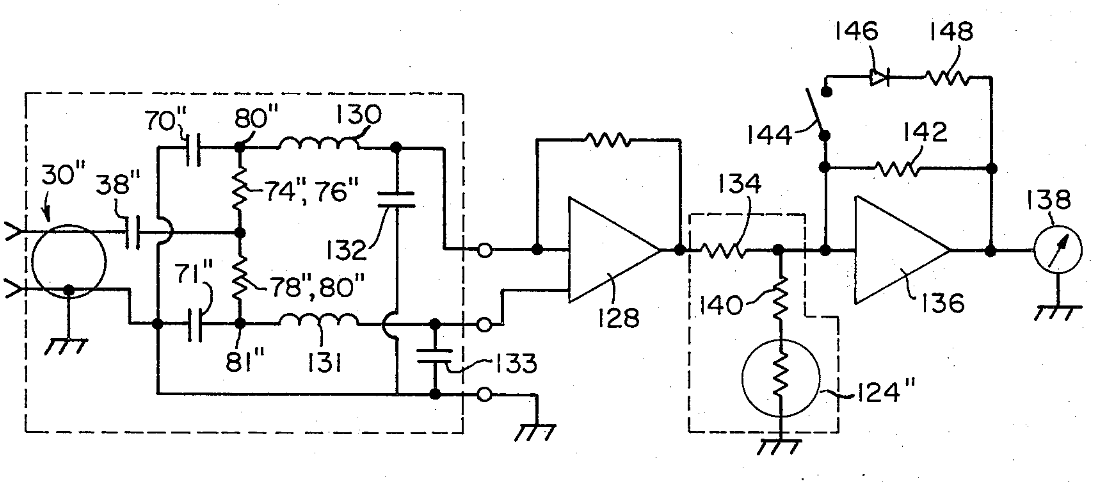
FIG. 5 is a schematic circuit diagram illustrative of the electrical operation of the modification of FIG. 4.

A thermistor 124 is located in a hollow section at the rear end of the otherwise solid rod 112 and in good thermal contact with its walls so as to be in good thermal coupling with the rear face 83 of load 46'. A pair of conductors 126 pass through the hollow section and out through the rear of the rod 112 and through the insulator 116 and electrically connect the thermistor 124, via the printed circuit board 86 and cable 18, to a metering circuit (FIG. 5). Thereby the thermistor 124 is effectively connected in the metering circuit and usable to compensate for the aforementioned variations in substrate conductivity. The metering circuit includes an output d-c amplifier 128 (e.g., chopper stabilized) which receives the direct voltage output of the power head, that is, the voltage developed across the thermoelectric load elements 74', 76' and 78', 80'. In the schematic circuit diagram of FIG. 5, parts corresponding electrically to those represented by structures in other portions of the drawing are represented by the same numerals with the addition of a double prime ("). The contacts 80" and 81" at the outer conductor ends of the load are connected via series chokes 130 and 131 and shunt capacitors 132 and 133 (which may be mounted on circuit board 86) and via cable 18 to the input of the amplifier 128. The latter is part of the external metering circuit; portions of the schematic of FIG. 5 that are physically located within the power head (FIG. 1 or 4) are enclosed within broken-line boxes. The output of the d-c amplifier 128 is supplied via a series resistor network 134 to another d-c amplifier 136, which in turn drives a suitable meter 138. Connected in shunt to ground from the resistor 134 is a circuit consisting of another resistor network 140 and the thermistor 124". The resistors 134 and 140 may also be conveniently mounted on circuit board 86. Connected across the feedback resistor 142 of amplifier 136 is another compensating network consisting of the series combination of a switch 144, a diode 146, and a resistor 148.

As power is absorbed by the load 46', the temperature rises at the center cold junction region 72 of the load 46' and at center conductor 42'. The latter temperatures are effectively the reference temperatures of the load and the difference between these cold-junction temperatures and the hot-junction temperatures determines the amplitude of the generated output voltage. With this cold-junction temperature rise, the resistance of the thermistor 124 decreases, and this decrease reduces the measured signal supplied by the amplifier 128. Since the conduction of the substrate 62 is reduced as the reference temperature of the cold junction region 72 increases, the temperature difference between hot and cold junctions tends to be excessive for a given power output, and therefore the generated output voltage also tends to be correspondingly excessive. Accompanying these temperature effects is the resistance decrease of the thermistor 124 in the metering circuit which compensates effectively to reduce the excess in output signal. By thermally connecting the thermistor directly to the cold junction region at the center conductor, the thermistor modifies the amplifier characteristic with temperature variations and compensates for changes in temperature of the cold junction without regard to the source of the temperature variations, whether they are ambient and external or whether they are due to the power being supplied and absorbed. With the boron nitride probe 112 located directly adjacent the center conductor 42', the temperature is measured where the cumulative thermal effects should be monitored in order to compensate for variations in the reference temperature at the cold junction.

In addition to the variations in the cold junction temperature with variations in the power input, there is also a variation in the entire substrate temperature and particularly at those portions which are varying with temperature as the power input varies. Since the compensation provided for by the thermistor 124 produces a basic compensation for variations in the reference temperature of the load (i.e., that of the center cold junction), it is possible by an additional compensation of the direct output voltage to respond to variations in the power input and produce an appropriate insertion of non-linear compensation as those power values change. One suitable circuit for such compensation includes the diode 146 and resistor 148 across feedback resistor 142 of the second d-c amplifier 136. The switch 144 is closed, either manually or under relay control, only when the meter is used for measuring power in the watt range, where the effects on substrate conductivity are substantial. The diode 146 conducts varying amounts depending upon the amplitude of the voltage input to the d-c amplifier 136, which voltage varies with the power being measured. The shunt resistor 148 tends to decrease the level of the output voltage when the diode 146 conducts. Thus, for greater levels of input power, the output voltage is greater, and diode 146 tends to conduct more to connect resistor 148 in the output circuit to reduce the output voltage amplitude. Thereby, the network 144, 146, 148 operates as a non-linear function generator and compensates for excessive output voltages generated by excessive temperature differences due to reduced conductivity of the substrate. Thus, by variable insertion of a resistor into the network to vary the amplitude gain with varying input, an effective compensation is achieved for the non-linear output (due to varying thermal conductivity with variations in temperature of the substrate).

Accordingly, the output signal that ultimately drives the meter 138 includes compensation in two respects. In the first respect, the final output signal varies with the temperature of the center conductor or cold junction of the load. This cold junction temperature varies with variations in ambient and external sources of heat and also with the power being absorbed by the load. The thermistor 124 is effectively coupled thermally to the substrate to detect these variations in reference temperature of the substrate and to vary the output voltage in a direction to compensate for the varying conductivity of the substrate. In addition, the actual changes in temperature of the substrate with varying input and the resulting variations in substrate conductivity are compensated by inserting a variable compensating impedance into the measuring circuit as the signal level corresponding to the power varies. The latter compensation is made only for power measurements in the watt range where the non-linearity is substantial.

Thus a new and improved thermoelectric calorimeter is provided for directly measuring watt levels of microwave power without forced cooling. Various modifications of this invention and of its features will be apparent to those skilled in the art from the foregoing description and within the scope of the following claims.

What is claimed is:

1. In a microwave power measuring apparatus comprising:

a microwave transmission line having a plurality of electrically conductive elements arranged as a waveguide with spaced coaxial waveguide surfaces and with generally coplanar faces transverse to said waveguide surfaces and having a thermal energy transfer path including said waveguide surfaces and electrical insulating means for maintaining said surfaces at substantially the same temperature;

a thermoelectric load unit connected between said faces including:

an electrically insulating substrate;

at least one pair of dissimilar metallic thin films of substantial resistance on said substrate having portions forming a hot junction in the space between said waveguide surfaces;

and means for mounting said thermoelectric unit in thermally conductive relation to said waveguide surfaces and as a termination of said line and electrically coupling other portions of one and the other of said dissimilar films respectively to one and another of said coplanar faces;

and means for sensing voltages developed by said dissimilar films in response to temperature differences between said hot junction and said faces;

the improvement of:

said substrate having a thermal conductance along its length between the hot junction and cold junction sufficient for transfer of a watt level of energy and less than that of said thermal energy transfer path, and a housing in thermally conductive relation to said waveguide surfaces and having an external surface available to the ambient air and substantially larger in extent than that of the overall dimensions thereof, whereby there is effective transfer of a watt level of heat from the hot junction by conduction through said substrate to said housing and by convection to said air.

2. A microwave power measuring apparatus as recited in claim 1 wherein said load unit and waveguide surfaces are dimensioned for performance through X-band, and said substrate thermal resistance is about a plurality of degrees Centigrade per watt, whereby said substrate is effective for conducting a watt level of absorbed energy away from the hot junction to prevent excessive temperatures thereof during absorption of watt level microwave power.

3. A microwave power measuring apparatus as recited in claim 1 wherein the material of said substrate is aluminum oxide.

4. A microwave power measuring apparatus as recited in claim 3 wherein said substrate includes a strip of boron nitride attached to said aluminum oxide adjacent to said thin films for conducting heat therefrom.

5. A microwave power measuring apparatus as recited in claim 2 wherein said resistive films are respectively bismuth and nichrome.

6. A microwave power measuring apparatus as recited in claim 2 wherein said load unit further includes a contact film of negligible electrical resistance on said substrate and overlapping one of said resistive films, and said mounting means positions said contact and resistive films facing the coplanar face of the outer one of said waveguide surfaces, said outer coplanar face being anodized to provide a dielectric of low thermal resistance between said outer coplanar face and said contact film.

7. A microwave power measuring apparatus as recited in claim 1 wherein the external surface of said housing is finned to provide an external surface at least twice that of the overall dimensions thereof.

8. A microwave power measuring apparatus as recited in claim 7 and further comprising a cover attached around and to and thermally spaced from said housing for manually supporting said housing; said cover having openings therethrough enabling access of ambient air to the fins of said housing.

9. In a power measuring apparatus for microwaves up to X-band comprising:

a microwave transmission line having a plurality of electrically conductive elements arranged as a waveguide with spaced coaxial waveguide surfaces and having a thermal energy transfer path including said waveguide surfaces and an electrical insulating portion for maintaining said surfaces at substantially the same temperature;

a thermoelectric load unit connected between said surfaces including:

an electrically insulating substrate, at least one pair of dissimilar metallic thin films of substantial resistance on said substrate having portions forming a hot junction in the space between said waveguide surfaces;

and means for mounting said thermoelectric unit in thermally conductive relation to said waveguide surfaces and as a termination of said line and electrically coupling other portions of one and the other of said dissimilar films respectively to one and another of said surfaces;

and means for sensing voltages developed by said dissimilar films in response to temperature differences between said hot junction and said surfaces;

the improvement of:

the material of said substrate having a thermal resistance along its length greater than that of said thermal energy transfer path and sufficiently small so that said substrate is effective to continually transfer from the hot junction by conduction a watt level of heat produced by the absorption of watt-level microwave power.

10. A microwave power measuring apparatus as recited in claim 9 wherein said substrate includes a strip of boron nitride attached to the substrate adjacent to said thin films for conducting heat therefrom.

11. A microwave power measuring apparatus as recited in claim 9 wherein said load further includes two spaced contacts of film of negligible resistance on said substrate, one of said resistive films of said one pair overlapping one of said contacts;

another pair of resistive films having one thereof overlapping the other of said contacts;

said resistive films of said pairs extending in series along a linear path between said film contacts;

and a pair of openings through said substrate on opposite sides of said path and between said film contacts and forming a web of substrate for said film path;

whereby the effective electrical cross-sectional diameter of said substrate between said film contacts is substantially less than the linear dimension of said web.

12. A thermoelectric load unit for measuring microwave power up to X-band comprising:

an electrically insulating thermally conducting substrate;

two spaced contacts of film of negligible resistance on a face of said substrate;

two pairs of dissimilar metallic thin films of substantial resistance on said substrate face, each pair having overlapping film portions to form a hot junction between said contact films, and each pair having one of its films respectively overlapping one of said film contacts;

said resistive films of said pairs extending in series along a linear path between said film contacts;

a pair of openings through said substrate on opposite sides of said path and between said contact films and forming a web of substrate for said film path, whereby the effective electrical cross-sectional diameter of said substrate between said film contacts is substantially less than the linear dimension of said web;

and means for mounting said substrate adjacent waveguide surfaces whereby said resistive films serve as a terminating load therefor.

13. A thermoelectric load unit for measuring microwave power as recited in claim 12 wherein said resistive films of each pair are respectively bismuth and nichrome.

14. In a microwave power measuring apparatus comprising:

a microwave transmission line having a plurality of electrically conductive elements arranged as a waveguide with spaced coaxial waveguide surfaces;

a thermoelectric load unit connected between said surfaces including:

an electrically insulating substrate;

at least one pair of dissimilar metallic thin films of substantial resistance on a face of said substrate having portions forming a hot junction in the space between said waveguide surfaces;

and means for mounting said thermoelectric unit in thermally conductive relation to said waveguide surfaces and as a termination of said line and electrically coupling other portions of one and the other of said dissimilar films respectively to one and another of said waveguide surfaces;

and means for sensing voltages developed by said dissimilar films in response to temperature differences between said hot junction and said waveguide surfaces;

the improvement of:

said load unit including means for conducting heat to said coaxial surfaces;

variable resistance means responsive to variations in temperature of said waveguide surfaces for varying said developed voltages so as to compensate for variations in thermal conductivity of said load unit with temperature;

and means for thermally coupling said variable resistance means to the inner one of said coaxial surfaces at said load unit and for electrically isolating said variable resistance means therefrom.

15. A microwave power measuring apparatus as recited in claim 14 wherein said variable resistance means includes a thermistor, said thermal coupling means includes rod means engaging at one end the opposite face of said substrate adjacent said inner coaxial surface and at the other end said variable resistance means.

16. A microwave power measuring apparatus as recited in claim 14 and further comprising means for varying the developed voltages in accordance with the amplitude further to compensate for variations in thermal conductivity of said load unit with temperature.

17. A microwave power measuring apparatus as recited in claim 9 wherein said substrate includes aluminum oxide.

18. A thermoelectric load unit as recited in claim 12 wherein said substrate is formed of aluminum oxide.

19. In a microwave power measuring apparatus comprising:

a microwave transmission line having a plurality of electrically conductive elements arranged as a waveguide with spaced coaxial waveguide surfaces and having a thermally conductive path including said waveguide surfaces and an electrical insulating ring between said surfaces for maintaining said surfaces at substantially the same temperature;

a thermoelectric load unit connected between said surfaces including:

an electrically insulating substrate;

at least one pair of dissimilar metallic thin films of substantial resistance on said substrate having portions forming a hot junction in the space between said waveguide surfaces;

and means for mounting said thermoelectric unit in thermally conductive relation to said waveguide surfaces and as a termination of said line and electrically coupling other portions of one and the other of said dissimilar films respectively to one and another of said surfaces;

and means for sensing voltages developed by said dissimilar films in response to temperature differences between said hot junction and said surfaces;

the improvement of:

said substrate having a thermal resistance sufficiently low to conduct from said hot junction to said waveguide surfaces heat produced in said thermoelectric load by a watt level of microwave power and greater than that of said thermally conductive path;

and a thermal sink housing in thermally conductive relation to said waveguide surfaces and having an external surface available to the ambient air and substantially larger in extent than that of the overall dimensions thereof so that the watt level of heat conducted by said substrate tends to be removed from said housing by convection of ambient air.

20. A microwave power measuring apparatus as recited in claim 19 wherein the external surface of said housing is finned to provide an external surface at least twice that of the overall dimensions thereof.

21. A microwave power measuring apparatus as recited in claim 20 and further comprising a cover attached around and to and thermally spaced from said housing for manually supporting said housing; said cover having openings therethrough enabling access of ambient air to the fins of said housing.

* * * * *